United States Patent
Byrd et al.

(10) Patent No.: US 10,853,527 B2
(45) Date of Patent: Dec. 1, 2020

(54) SYSTEM FOR LOSS PREVENTION AND RECOVERY OF ELECTRONIC DEVICES

(71) Applicant: Top Dawg Media, Inc., San Gabriel, CA (US)

(72) Inventors: Wade Byrd, San Gabriel, CA (US); Brijesh Kamani, Gujarat (IN); Arjun Dedaniya, Gujarat (IN); Tyler Marshall, Denver, CO (US)

(73) Assignee: QEPR, INC., San Gabriel, CA (US)

( * ) Notice: Subject to any disclaimer, the term of this patent is extended or adjusted under 35 U.S.C. 154(b) by 0 days.

(21) Appl. No.: 16/531,959

(22) Filed: Aug. 5, 2019

(65) Prior Publication Data

US 2019/0370507 A1 Dec. 5, 2019

Related U.S. Application Data

(63) Continuation-in-part of application No. 15/814,277, filed on Nov. 15, 2017, now abandoned.

(60) Provisional application No. 62/424,295, filed on Nov. 18, 2016, provisional application No. 62/583,348, filed on Nov. 8, 2017.

(51) Int. Cl.
| | |
|---|---|
| *H04W 24/00* | (2009.01) |
| *G06F 21/88* | (2013.01) |
| *H04W 4/029* | (2018.01) |
| *H04M 1/02* | (2006.01) |
| *H04W 4/90* | (2018.01) |
| *H04W 4/80* | (2018.01) |
| *H04W 68/00* | (2009.01) |
| *H04W 60/00* | (2009.01) |

(52) U.S. Cl.
CPC .......... *G06F 21/88* (2013.01); *H04M 1/0202* (2013.01); *H04W 4/029* (2018.02); *H04W 4/80* (2018.02); *H04W 4/90* (2018.02); *H04W 60/00* (2013.01); *H04W 68/005* (2013.01)

(58) Field of Classification Search
CPC combination set(s) only.
See application file for complete search history.

(56) References Cited

U.S. PATENT DOCUMENTS

| | | |
|---|---|---|
| 9,297,882 B1 * | 3/2016 | Bhatia .................... H04W 4/21 |
| 9,569,950 B1 | 2/2017 | Will et al. |
| 2003/0088519 A1 | 5/2003 | Woodson et al. |

(Continued)

*Primary Examiner* — Justin Y Lee
(74) *Attorney, Agent, or Firm* — Jeffer Mangels; Butler & Mitchell LLP; Brennan C. Swain, Esq.

(57) ABSTRACT

A system for loss prevention and loss recovery of portable electronic devices. The system includes a server administered by an administrator, a software application executable on a portable electronic device in communication with the server, a unique registration identifier associated with the portable electronic device, and a distance tracking device. The association between the portable electronic device and the unique registration identifier is stored on the server. The software application is configured to connect to the distance tracking device. The distance tracking device is configured to provide a notification when the distance tracking device is further than a predetermined boundary from the portable electronic device. When the unique registration identifier is entered at a website associated with the server, return delivery information is provided.

13 Claims, 13 Drawing Sheets

(56) References Cited

U.S. PATENT DOCUMENTS

| | | | |
|---|---|---|---|
| 2007/0018812 A1* | 1/2007 | Allen | G08B 21/0202 |
| | | | 340/539.13 |
| 2007/0279245 A1 | 12/2007 | Sholem | |
| 2007/0299791 A1 | 12/2007 | MacK | |
| 2012/0075098 A1 | 3/2012 | Kuncl | |
| 2012/0226751 A1* | 9/2012 | Schwaderer | A01K 29/00 |
| | | | 709/204 |
| 2015/0109126 A1 | 4/2015 | Crawford | |
| 2016/0239733 A1 | 8/2016 | Hertz et al. | |
| 2017/0220992 A1* | 8/2017 | Waters | G01S 19/01 |
| 2017/0228951 A1* | 8/2017 | Foot | G07C 9/00571 |

* cited by examiner

SYSTEM FOR LOSS PREVENTION AND RECOVERY OF ELECTRONIC DEVICES

CROSS REFERENCE TO RELATED APPLICATIONS

This application is a continuation-in-part of U.S. patent application Ser. No. 15/814,277, filed Nov. 15, 2017, which claims the benefit of U.S. Provisional Application No. 62/424,295, filed Nov. 18, 2016 and 62/583,348, filed Nov. 8, 2017, the entireties of which are incorporated by reference herein.

FIELD OF THE INVENTION

The present invention relates generally to a system for the recovery of lost items such as cellular telephones or tablets.

BACKGROUND OF THE INVENTION

When smartphones, tablets or other portable electronic devices are lost, the content is lost as well. Many times it is never recovered. The content that is lost can include and is not limited to irreplaceable personal photos, as well as videos of family, friends and important events. Other content that is lost is personal data, including the contact information of family, friends and business contacts. The present invention is useful to help prevent the loss of a person's smartphone, tablet or other portable electronic device.

SUMMARY OF THE PREFERRED EMBODIMENTS

In accordance with a first aspect of the present invention there is provided a system for loss prevention and loss recovery of portable electronic devices that includes a server administered by an administrator, a first software application executable on a first portable electronic in communication with the server, a second software application executable on a second portable electronic in communication with the server, a first unique registration identifier associated with the first portable electronic device, and a second unique registration identifier associated with the second portable electronic device. The association between the first portable electronic device and the first unique registration identifier is stored on the server, and the the association between the second portable electronic device and the second unique registration identifier is stored on the server. The system also includes first and second distance tracking devices. The first software application is configured to connect to the first distance tracking device, and the first distance tracking device is configured to provide a first notification when the first distance tracking device is further than a predetermined boundary from the first portable electronic device. The second software application is configured to connect to the second distance tracking device, and the second distance tracking device is configured to provide a second notification when the second distance tracking device is further than a predetermined boundary from the second portable electronic device. When the first unique registration identifier is entered at a website associated with the server, return delivery information associated with the first portable electronic device is provided, and when the second unique registration identifier is entered at the website associated with the server, return delivery information associated with the second portable electronic device is provided.

In a preferred embodiment, the first and second portable electronic devices (or the first and second users or first and second distance tracking devices or all of these components) can be associated with a group (e.g., a family group). When they are associated with a group a location of the first portable electronic device can be seen on the second software application and vice versa. In an embodiment, when they are associated with a group a location of the first distance tracking device can also be seen on the second software application and vice versa. Preferably, the first distance tracking device includes a first bluetooth range within which the first distance tracking device is in communication with the first portable electronic device (and outside of which it is not), the second distance tracking device includes a second bluetooth range within which the second distance tracking device is in communication with the first distance tracking device (and outside of which it is not). If the second distance tracking device is outside of the first bluetooth range, but is in communication with the first distance tracking device, a third bluetooth range is defined between the first portable electronic device and the second distance tracking device so that the second distance tracking device can communicate with the first portable electronic device. The third bluetooth range is greater than the first and second bluetooth ranges.

In a preferred embodiment, the first distance tracking device includes a key fob and a removable member. The removable member can be separated from the key fob, and includes a keychain aperture defined therein. Preferably, the system includes a first tag that includes the first unique registration identifier thereon, the first tag is secured to the first portable electronic device or a first case for the first portable electronic device. The first tag can include near-field communication such that it can communicate the first unique registration identifier. In a preferred embodiment, the first distance tracking device is configured such that the first notification changes from a first state to a second state as the first distance tracking device comes into closer proximity to the first portable electronic device. For example, the second state can be faster frequency beeping than the first state.

In a preferred embodiment, the first distance tracking device includes a button thereon, and activation of the button causes the first portable electronic device to perform a first action chosen from dial 911, dial a contact, message one or more contacts. Preferably, the first distance tracking device includes a button thereon and activation of the button for a first predetermined amount of time causes a first action to occur and activation of the button for a second predetermined amount of time causes a second action to occur. The first and second actions can be chosen from dial 911, dial a contact, message one or more contacts. In a preferred embodiment, the first distance tracking device includes a Wi-Fi access point therein, whereby the first tracking device is a Wi-Fi extender that the first portable electronic device can connect to.

In accordance with another aspect of the present invention there is provided a computer-implemented method for the loss prevention and loss recovery of a first user's portable electronic device. The method includes loading a first software application on the portable electronic device. The first software application is associated with a server. Associating a first unique registration identifier with the first user's portable electronic device, obtaining a first distance tracking device that is configured to provide a notification when the first distance tracking device is further than a predetermined boundary from the first user's portable electronic device, connecting the first distance tracking device to the first software application, and placing the first unique registration identifier on the first user's portable electronic device or a case for the first user's portable electronic device. In a preferred embodiment, the method includes reporting the first distance tracking device as lost to the server. The first distance tracking device has a bluetooth (or other communication protocol) range. When a second user's portable electronic device enters the bluetooth range, the second user's portable electronic device communicates a location of the first distance tracking device to the server. The method further includes communicating the location of the first distance tracking device to the first user's portable electronic device.

In a preferred embodiment, the method includes associating the first portable electronic device (and its user) with a second user's portable electronic devices (that includes the software app thereon) with a group. The first unique registration identifier is associated with a tag that includes near-field communication, and the method further includes placing a second user's portable electronic device in close proximity to the tag, where the first unique registration identifier is communicated to the second user's portable electronic device.

In accordance with another aspect of the present invention there is provided a kit for loss prevention and recovery of a portable electronic device. The kit includes a tag configured to be secured to a portable electronic device or a case for a portable electronic device, and a distance tracking device that is configured to connect to a portable electronic device that has been associated with the unique registration identifier. The tag includes a unique registration identifier and contact source information thereon. The contact source information includes at least one of a telephone number, a website or an email address. The distance tracking device is configured to provide a notification when the distance tracking device is further than a predetermined boundary from the portable electronic device that has been associated with the unique registration identifier. In a preferred embodiment, the predetermined boundary is at least one of a predetermined distance or when the distance tracking device disconnects from the associated portable electronic device. Preferably, the distance tracking device includes a button that when activated causes the associated portable electronic device to emit at least one of a sound or a vibration.

In a preferred embodiment, the kit further comprising a case and the tag is secured to the case. Preferably, the case includes a back having an opening defined therein and a protrusion that extends into the opening. The tag is secured to the protrusion. In preferred embodiments, the distance tracking device is a key fob or a smart watch.

In accordance with another aspect of the present invention there is provided a system for loss prevention and loss recovery of portable electronic devices. The system includes a server administered by an administrator, a software application executable on a portable electronic device in communication with the server, a unique registration identifier associated with the portable electronic device, and a distance tracking device. The association between the portable electronic device and the unique registration identifier is stored on the server. The software application is configured to connect to the distance tracking device. The distance tracking device is configured to provide a notification when the distance tracking device is further than a predetermined boundary from the portable electronic device. When the unique registration identifier is entered at a website associated with the server, return delivery information is provided.

In a preferred embodiment, the return delivery information is a first address associated with an owner of the portable electronic device or a second address associated with the administrator. Preferably, the return delivery information includes tracking information from a parcel delivery service. In a preferred embodiment, the distance tracking device is a second portable electronic device that includes a second software application executable thereon that is associated with the first software application. Preferably, the second portable electronic device is a smartwatch. However, the second portable electronic device can be a smartphone or other portable electronic device.

In accordance with another aspect of the present invention there is provided a computer-implemented method for the loss prevention and loss recovery of a portable electronic device. The method includes loading a software application on the portable electronic device. The software application is associated with or in communication with a server. The method includes associating a unique registration identifier with the portable electronic device and obtaining a distance tracking device. The distance tracking device is configured to provide a notification when the distance tracking device is further than a predetermined boundary from the portable electronic device. The method also includes connecting the distance tracking device to the software application, and placing the unique registration identifier on the portable electronic device or a case for the portable electronic device. In a preferred embodiment, the method also includes entering the unique registration identifier at a website associated with the server. Return delivery information is provided to the person entering the unique registration identifier. Preferably, the distance tracking device is a second portable electronic device, and the method includes loading a second software application on the second portable electronic device.

In accordance with another aspect of the invention the software application is embodied in a computer-readable, non-transitory medium including instructions that, when executed by a source device in cooperation with a server, enables the source device to implement the system for loss prevention and loss recovery (or any portion of the system) of the source device as described herein. The present invention also included a computer implemented method for implementing the system for loss prevention and loss recovery of portable electronic devices as described herein. U.S. Pat. No. 9,706,519 is incorporated by reference in its entirety herein.

A preferred embodiment, the present invention is a two part system that includes the loss prevention of smart phones, tablets or other personal or portable electronic devices and the recovery of smart phones, tablets or other personal or portable electronic devices. In an exemplary embodiment, the system operates under the Smartphone Registry (smartphoneregistry.com). For example, the key fobs, tags, cases and hardware can be available at QEPR.com and smartphoneregistry.com.

An exemplary set of steps for set up and activation of the loss prevention system described herein will now be described. It will be appreciated that these steps are only exemplary and those of ordinary skill in the art can make suitable modifications or changes. 1. Bluetooth Function—under the settings tab, the Bluetooth function on the smartphone or tablet must be turned 'ON.' 2. Internet connection—the smartphone or tablet must be connected to the internet to initially download the QEPR app. 3. Download the QEPR app at the iTunes App Store for iPhones and iPads and at the Google Play Store for Android smartphones and tablets. 4. Set up the 'QEPR app' for basic use: Step 1—launch the QEPR app; Step 2: activate the distance tracking device—find the new device icon on the screen, then swipe it to the left; Step 3: Connect the QEPR app to the distance tracking device (e.g., smart watch, key fob or other portable sensor assembly).

For ease of explanation, the smart phones, tablets or other personal or portable electronic devices are all collectively referred to herein as smart phones.

BRIEF DESCRIPTION OF THE DRAWINGS

The invention may be more readily understood by referring to the accompanying drawings in which:

FIGS. 8-1 and 8-2 show an exemplary mind map of the smart phone app of the present invention;

Like numerals refer to like parts throughout the several views of the drawings.

DETAILED DESCRIPTION OF THE PREFERRED EMBODIMENTS

Figure 1:
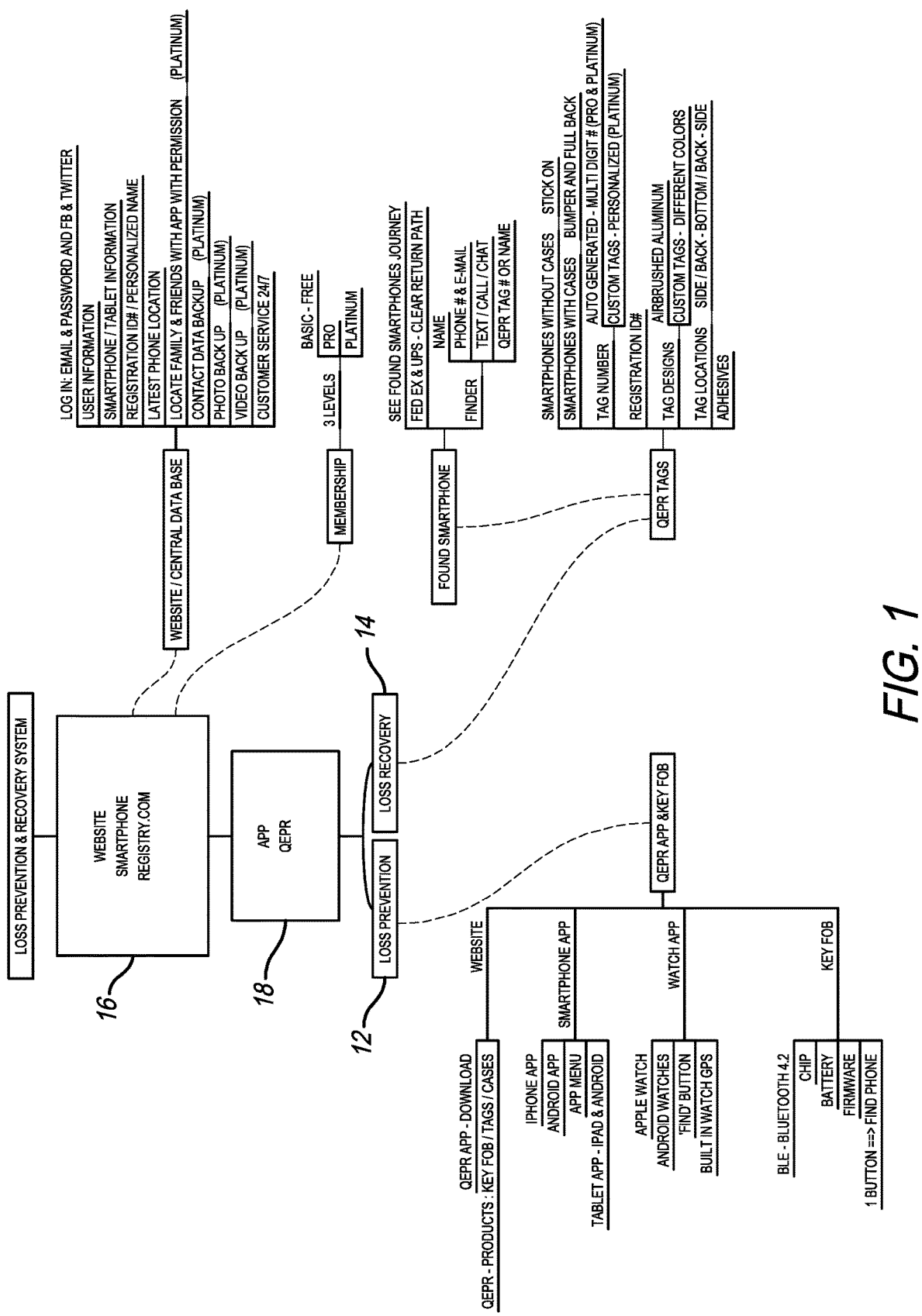
FIG. 1 is a flow chart showing a loss prevention and recovery system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Some of the drawings herein and the following discussion are intended to provide a brief, general description of a suitable computing environment in which at least a portion of the subject matter disclosed herein may be implemented. Although not required, aspects of a system and method for loss recovery or loss prevention, a portion of which takes place in a networked computing environment, will be described in the general context of computer-executable instructions, such as program modules, being executed by a personal computer and/or computer-readable media on which such instructions are stored. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to the drawings, wherein the showings are for purposes of illustrating the present invention and not for purposes of limiting the same, FIG. 1—show a system for helping prevent the loss of a cell phone, tablet or other portable electronic device together with a system for recovery of a cell phone, tablet or other portable electronic device. For descriptive purposes the invention will be described where the portable electronic device is a smart phone. Generally, the entire system is referred to herein as a loss prevention and recovery system 10.

FIG. 1 shows an exemplary chart of the entire loss prevention and recovery system 10 in accordance with a preferred embodiment of the present invention. As shown, the system 10 includes two separate components, loss prevention system 12 and loss recovery system 14. Both the loss prevention system 12 and loss recovery system 14 operate through or via a website (e.g., smartphoneregistry.com) 16 and an app (e.g., QEPR) 18. Both the loss prevention system and loss recovery system will be described in more detail below.

Figure 2:
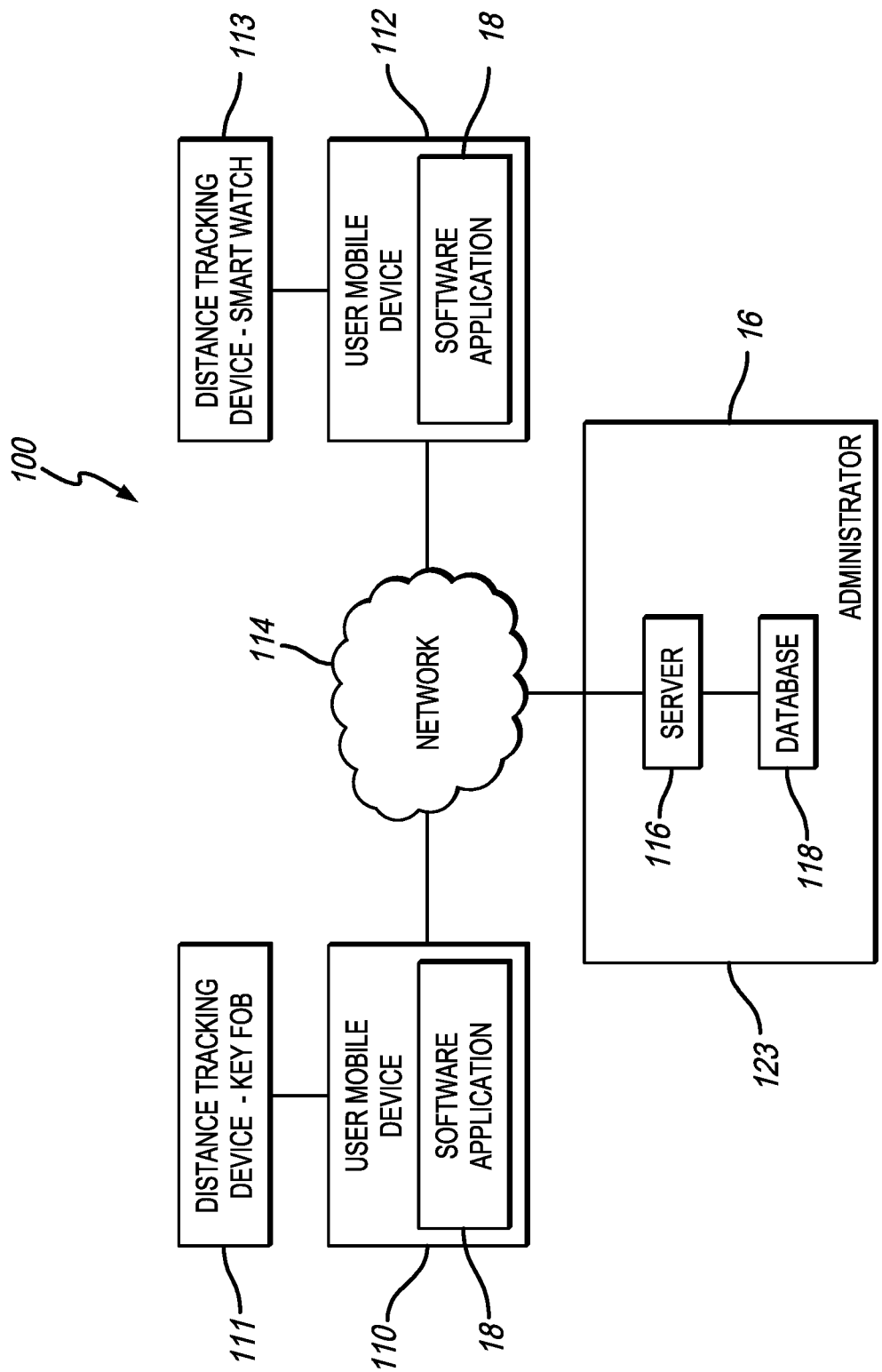
FIG. 2 is a diagram showing a networked computing environment that allows implementation of the methods and systems disclosed herein.

With reference to FIG. 2, a preferred embodiment of the loss prevention and recovery system described in the context of an exemplary computer network system 100 illustrated. System 100 includes two portable electronic devices 110 and 112 as part of the system. Two portable electronic devices are shown to illustrate two different aspects or versions of the invention. As described below, the first portable electronic device 110 is in communication with a distance tracking device that is a key fob 111 and the second portable electronic device 112 is in communication with a distance tracking device that is a smartwatch 113 or the like. The portable electronic devices 110 and 112, for example, are cellular or mobile telephones, tablets or other portable electronic devices, that are linked via a communication medium, such as a network 114 (e.g., the Internet), to an electronic device or system, such as a server 116, that is part of an administrator system 123. It will be appreciated that this essentially means that the components in box 123 in FIG. 2 are part of a system operated by the company that owns or administers the software application to users (e.g., smartphoneregistry.com). However, this is not a limitation on the present invention. In a preferred embodiment, the portable electronic devices 110 and 112 each include a source client or software application 18 running thereon. As shown in some of the figures, the software application 18 is referred to herein as QEPR 18 (pronounced "keeper"). The server 116 may further be coupled, or otherwise have access, to a database 118 or databases and other components, such as electronic storage, and computer systems (not shown). It will be appreciated that the database 118 is configured to store account information for all the users who are registered with the system. Although the embodiment illustrated in FIG. 2 includes a single server 116 coupled to two portable electronic devices 110 and 112 (first and second portable electronic devices 110 and 112) via the network 114, it should be recognized that, as described herein, embodiments of the invention may be implemented using two or more such portable electronic devices coupled to one or more such servers. Moreover, the network 114 may include or otherwise be coupled to one or more telecommunication towers that provide network connectivity to the portable electronic devices.

It should be understood that first and second portable electronic devices 110 and 112 include or are otherwise coupled to a computer screen or display. First and second portable electronic devices 110 and 112 can be used for various purposes including both network and local computing processes. The first and second user devices 110 and 112 are linked via the network 114 to server 116 so that software programs, such as, for example, a browser or other applications, running on the first and second user devices 110 and 112 can cooperate in two-way communication with server 116. Server 116 may be coupled to database 118 and/or electronic storage to retrieve information therefrom and to store information thereto. Moreover, the server 116 may communicate with the first user device 110 (and/or second device 112) and/or GPS/triangulation systems known in the art in such manner as to allow the server 116, using map data stored in the database 118 or elsewhere, to generate location data, such as, for example, HTML data, that may be used by a browser or similar application to display the location of the first portable electronic device 110 (and/or second portable electronic device 112). Additionally, the server 116 may be coupled to the computer system in a manner allowing the server to delegate certain processing functions to the computer system. Accordingly, it should be understood that when reference is made herein to the server 116 performing a function, the server 116 not actually be performing the function, but may delegate it to a separate computer system.

Figure 3:
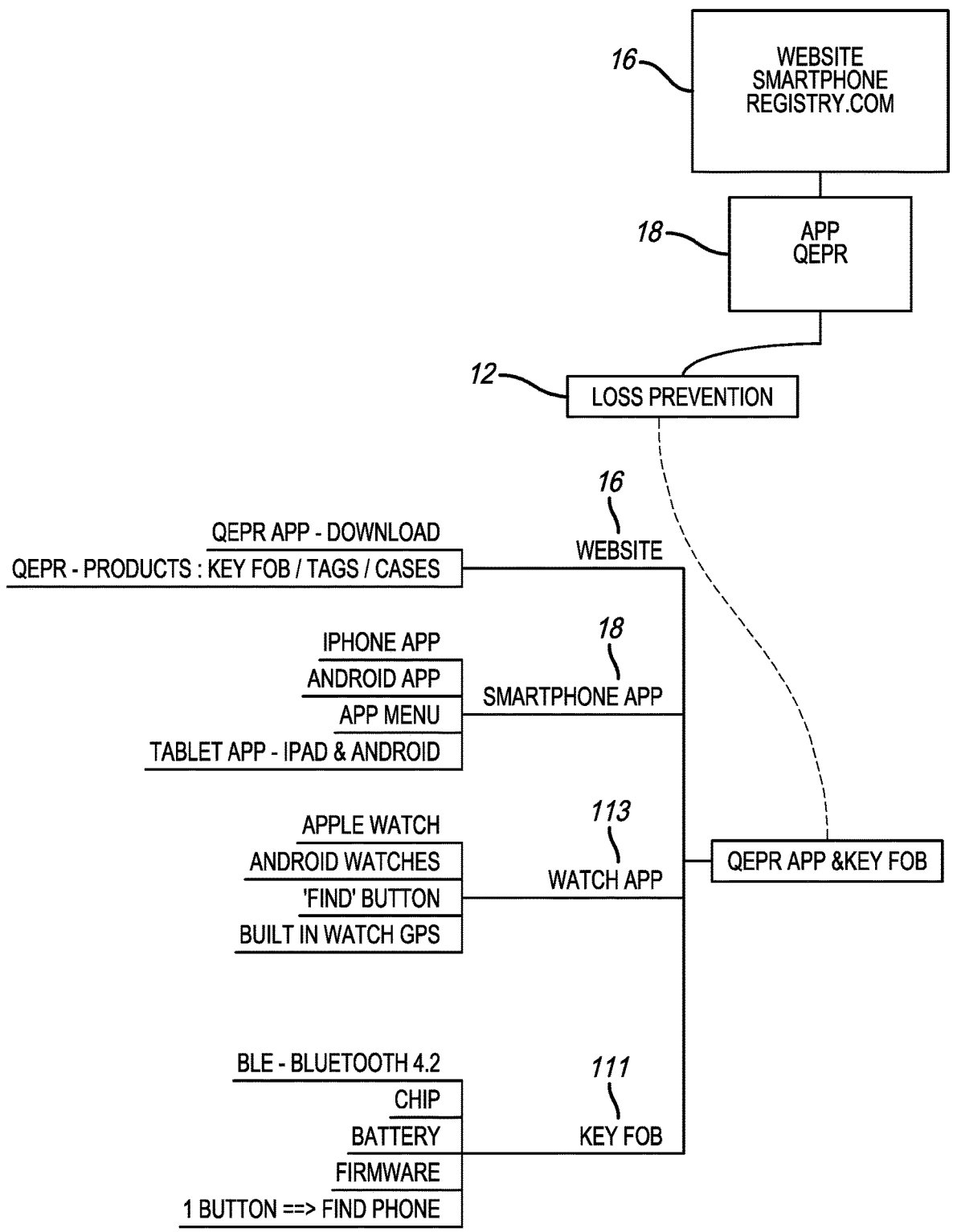
FIG. 3 shows the loss prevention portion of the system shown in FIG. 1.

The loss prevention system 12 will be described first. FIG. 3 shows an exemplary chart of the loss prevention system 12. Generally, the loss prevention system 12 includes a component or distance tracking device that is worn or otherwise kept on the person of a user and that is in communication with the app user's smart phone. In a preferred embodiment, the present invention includes the software application 18 loaded on the user's mobile device and a distance tracking device that is part of either a software application that is loaded on another portable electronic device, such as a smartwatch 113 or a standalone distance tracking device, such a key fob 111 or other wearable sensor. In use, the distance tracking device and smart phone app communicate to notify the owner that their smart phone has exceeded a predetermined proximity distance from the distance tracking device to prevent loss. When the predetermined proximity distance has been exceeded the user may be notified via a noise, tone and/or vibration of the distance tracking device.

In an embodiment where a smart watch 113, such as an Apple watch or Android watch is used, a software application is downloaded to the smart watch 113 and is in communication with the app 18 on the user's smart phone. When the user exceeds the predetermined proximity distance (e.g., 30 feet) from the smart phone, the smart watch 113 notifies the user. In a preferred embodiment, the app on the smart watch 113 also includes a button or the like that when pressed will cause the smart phone to beep and/or vibrate. This allows the user to locate a lost smart phone.

Figure 4:
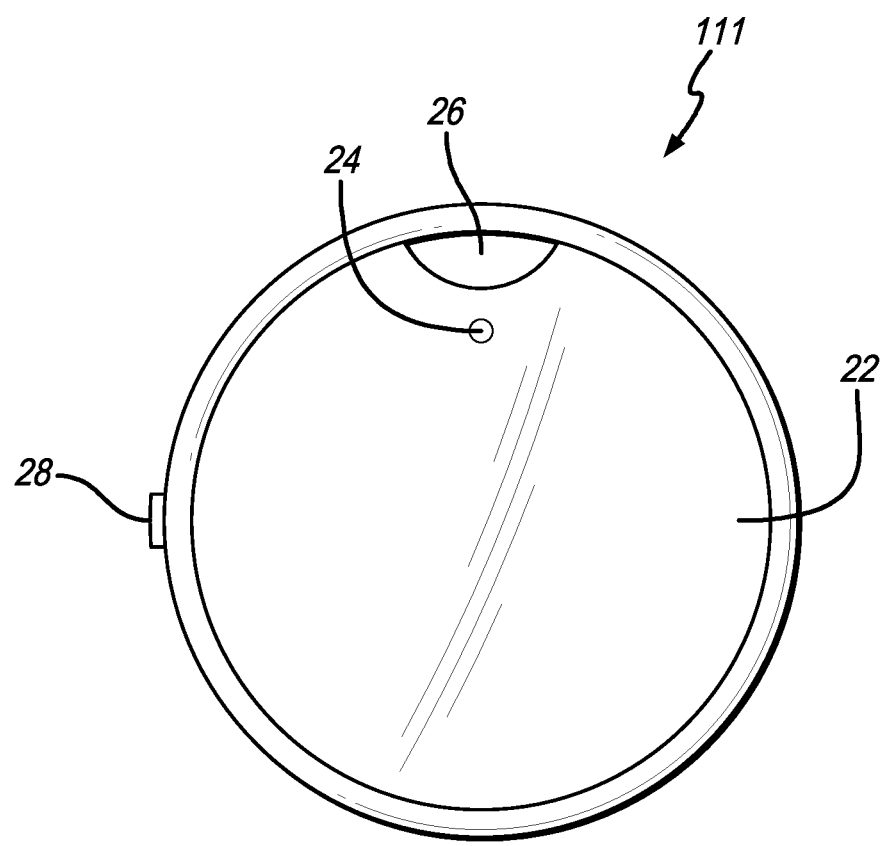
FIG. 4 is an elevational view of an exemplary key fob in accordance with a preferred embodiment of the present invention.

As shown in FIGS. 3 and 4, the other type of distance tracking device is a wearable or portable sensor such as a key fob 111. The key fob 111 preferably includes Bluetooth capability to pair with the user's smart phone (and communicate with the app 18 thereon), along with a chip, battery and necessary firmware. In use, when the user exceeds the predetermined proximity distance from the smart phone, the key fob 111 notifies the user (e.g., via a sound or vibration on the key fob 111 and/or phone). In a preferred embodiment, the key fob 111 also includes a 'Find' button or switch that when pushed or otherwise activated causes the connected smart phone to emit a loud ring tone and/or vibration so the smart phone can be located.

FIG. 4 shows an exemplary key fob 111 in accordance with the present invention. Key fob 111 includes casing or housing 22, notification light 24, keychain aperture 26 and find button 28. The chip, sensor, and other components are housed in the housing 22.

It will be appreciated that other types of wearable or portable sensors are also within the scope of the present invention. For example, the actual sensor can be housed in a case made of plastic, rubber, elastomer, metal or the like. Preferably, the case is water resistant to prevent the entry of sweat, rain or other liquids. However this is not a limitation, and the case may not be water resistant. In an embodiment, the distance tracking device can include a screen, such as an OLED screen or the like. Internally, the distance tracking device may include a battery (e.g., a rechargeable lithium ion or lithium polymer battery) or a battery that is rechargeable via USB to micro USB or the like with an AC adapter. The distance tracking device.

In an exemplary embodiment, the distance tracking device can be interchangeably worn on different wristbands or watchbands. For example the wristbands can be made of leather, metal (e.g., stainless steel), silicon, nylon (paracord), elastomer or the like. In other embodiments, the distance tracking device can be worn on a bracelet (e.g., leather, metal, classic bands) or a clip-on sensor that can be worn on, e.g., belts, pants pockets, shirt pockets, etc.

In a preferred embodiment, The distance tracking device can be attached to the wearable items or accessories, garments or other personal accessories with an attachment device or fastener, such as a plastic clip, metal clip, metal clip and lock, metal ring, silicone pocket, silicone pouch, elastomer pocket, elastomer pouch, leather strip, nylon, buttons, snaps, Velcro or the like.

In a preferred embodiment, the distance tracking device can be housed in a case that includes a special design or shape. For example, the case can be plain or include items on their such as an American flag, dog paw, heart, cross, peace symbol, musical note, Ying/Yang, Celtic good luck knot, horseshoe, "like"/thumbs up, shaka/hang ten sign or I love you hand sign. In preferred embodiment, the screen on the housing or case of the distance tracking device can display a call, text, calendar event, time and date.

Figure 5:
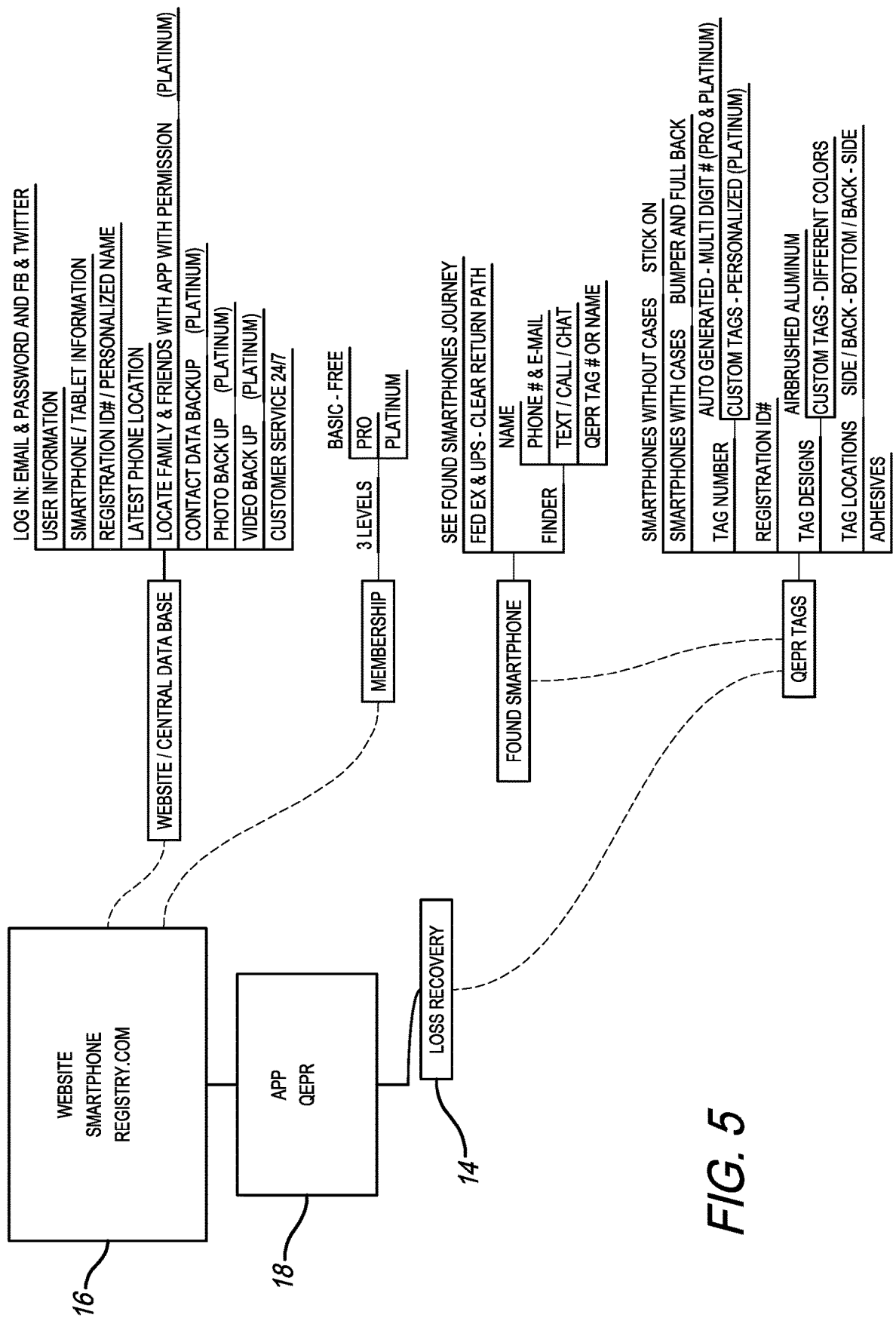
FIG. 5 is shows the loss recovery portion of the system shown in FIG. 1.
Figure 6:
FIG. 6 is an elevational view of an exemplary tag in accordance with a preferred embodiment of the present invention.
Figure 7:
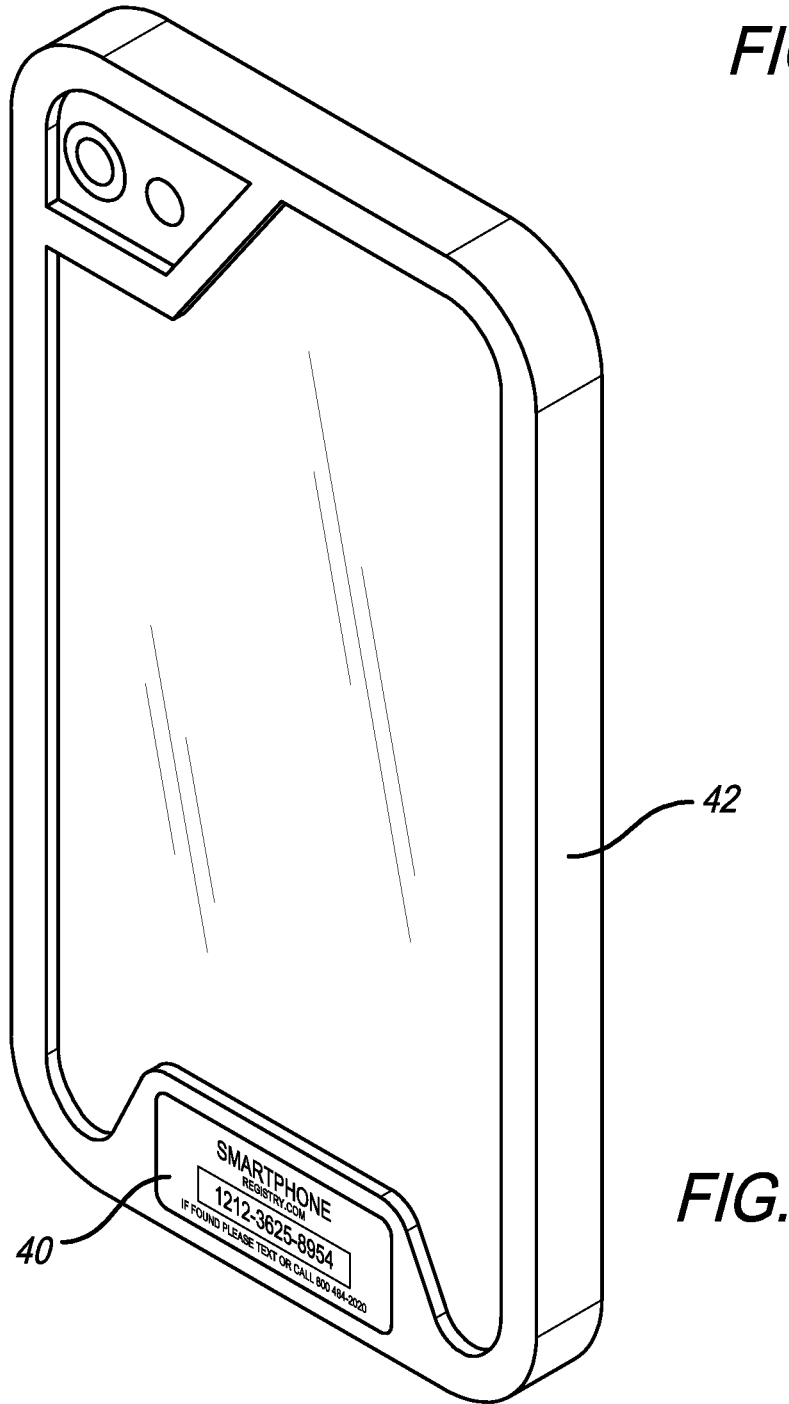
FIG. 7 is a perspective view of a smartphone in a case having a tag thereon in accordance with a preferred embodiment of the present invention.

With reference to FIGS. 5-7, the loss recovery system 14 will now be described. FIG. 5 shows a portion of the FIG. 1 flowchart that is associated with the loss recovery system 14. As shown in FIG. 6, in a preferred embodiment, the loss recovery system 14 includes a smart phone identification label or tag 40 that can be placed on the smart phone or on a smart phone case. In an exemplary embodiment, the label can be a die cut vinyl sticker or a brushed aluminum or thin stainless steel plate. The tag 40 can be placed on the back or side of the smart phone or the smart phone case. In a preferred embodiment, the tag 40 (positioned on the back, side, top or front) includes website, telephone number (can be texted or called), email address of other contact source information for contacting the administrator 123 (e.g., smartphoneregistry.com) together with a unique registration identifier (may include numbers, letters or both) associated with the user and/or the particular smart phone. The unique registration identifier is registered with the administrator. Any unique registration identifier is within the scope of the present invention. For example, the tag 40 can include a barcode or a QR code. QR codes enable the ability to determine the location of where the QR code was located when scanned. Therefore, when a finder finds a phone and scans the QR code, smartphoneregistry.com can be advised of the location of the finder. In another embodiment, the tag 40 can include the ability for a finder to "tap" the tag 40 with their phone (or place it in close proximity to the tag) to scan or receive/retrieve the unique registration identifier. For example, the tag can include near-field communication or NFC technology. Near-field communication is a set of communication protocols that enable two electronic devices, one of which is usually a portable device such as a smartphone, to establish communication by bringing them within a relatively short distance (e.g., 4 cm) from one another. Therefore, when a finder finds a lost phone the finder can tap their NFC enabled phone on or place their phone close to the tag and the finder's phone will receive the unique registration identifier. Preferably, when the tag is tapped or scanned by the portable electronic device the QEPR URL comes up on the screen, thus allowing the user to go to the website to go through the steps described herein to return the lost phone. For example, at the website, the finder can enter their first name and phone number, which will send it to the app contacts and/or app support dashboard.

As shown in FIG. 7, in another embodiment the label 40 can come together with a case 42. The tag 40 can be embedded in an indentation or depression in the case or 3-D printed within the case itself. In FIG. 7, the tag 40 is secured to or otherwise positioned on a bumper or protrusion that extends upwardly from the bottom of the case 42 and into a central opening defined by the sides, top and bottom of the case 42. It will be appreciated that the bumper can be located anywhere on the case 42. In another embodiment, the case can include a solid back and the tag 40 can be located anywhere thereon. The tag 40 can also be located on the sides, the bottom, the top or the front of the case.

In a preferred embodiment, the system includes the central database 118 in which the smart phone's unique registration identifier and the owner's information is entered into and stored (see FIG. 2). For example, the central database 118 can store owner information, such as name, address, mobile and home phone numbers and email address. The central database can also store smart phone information, such as brand, model and/or serial number. The database 118 can also include photos, videos and contacts of users, as described below.

It will be appreciated, that, the loss recovery system 14 can reunite lost smart phones with their owners, if a phone is found. In use, when a phone is lost and is found by a finder, the system 14 provides at least one, and preferably more than one, way for the finder to contact the administrator (e.g., smartphoneregistry.com). First, the finder can call or text message the phone number on the tag 40 and provide the unique registration identifier to the administrator so that the associated smart phone can be identified. In a preferred embodiment, the finder can also log on to smartphoneregistry.com to enter the unique registration identifier (via email, chat or other message entry) so that the associated smart phone can be identified. In each situation, the phone can then be returned to the owner. In a preferred embodiment, when the administrator receives the unique registration identifier, the associated smartphone is automatically identified by the system. An email or phone call can then be sent or made to the owner to let them know that their phone has been located. Location information can also be provided to the owner. In a preferred embodiment, the app 18 includes the ability for the owner to see where there phone is located using GPS technology. That way the owner can log on to smartphoneregistry.com and see the location of their lost or stolen phone.

As will be appreciated, it may take some effort for a finder to return an owner's phone. Therefore, in a preferred embodiment, the present invention includes the ability for a finder to deliver the phone to a courier service (e.g., FedEx, UPS, USPS) and then have the courier service deliver the phone to the owner or the administrator. Preferably, an address and/or tracking number is communicated to the finder (e.g., by text message on the found phone or their own phone, by email, by a call or other method). The finder can then take the phone to the courier, provide the courier with the tracking number and the courier will return it to either the owner, to smartphoneregistry.com or to another designated address. If the phone is delivered to smartphoneregistry.com it can then be shipped to or picked up by the owner. In an embodiment, the tracking number has the delivery address associated therewith. The shipping costs can be charged to smartphoneregistry.com or the owner. In another embodiment, the courier can be notified by the finder or smartphoneregistry.com and the courier can pick up the phone from the finder.

FIG. 5 also shows the ability for users to register with the website at a number of different membership levels. Each of the different membership levels can provide different features to the user. For example, as shown, the basic membership level can be offered for free to the user. Further membership levels may include payment from the user. These membership levels (e.g. Pro and platinum) may provide enhanced features. For example, the platinum level may allow a user to choose a custom unique registration identifier (e.g., their initials), and may include the ability to back up photos, videos and contacts stored in the memory of the user's smart phone.

It will be appreciated by those of ordinary skill in the art that the software portion in the loss prevention system 12 herein is tied to a process and a physical machine (such as a computer and/or a mobile device). It is also tied to the hardware, central database and process in the loss recovery system 14 herein.

Figures 1, 8:
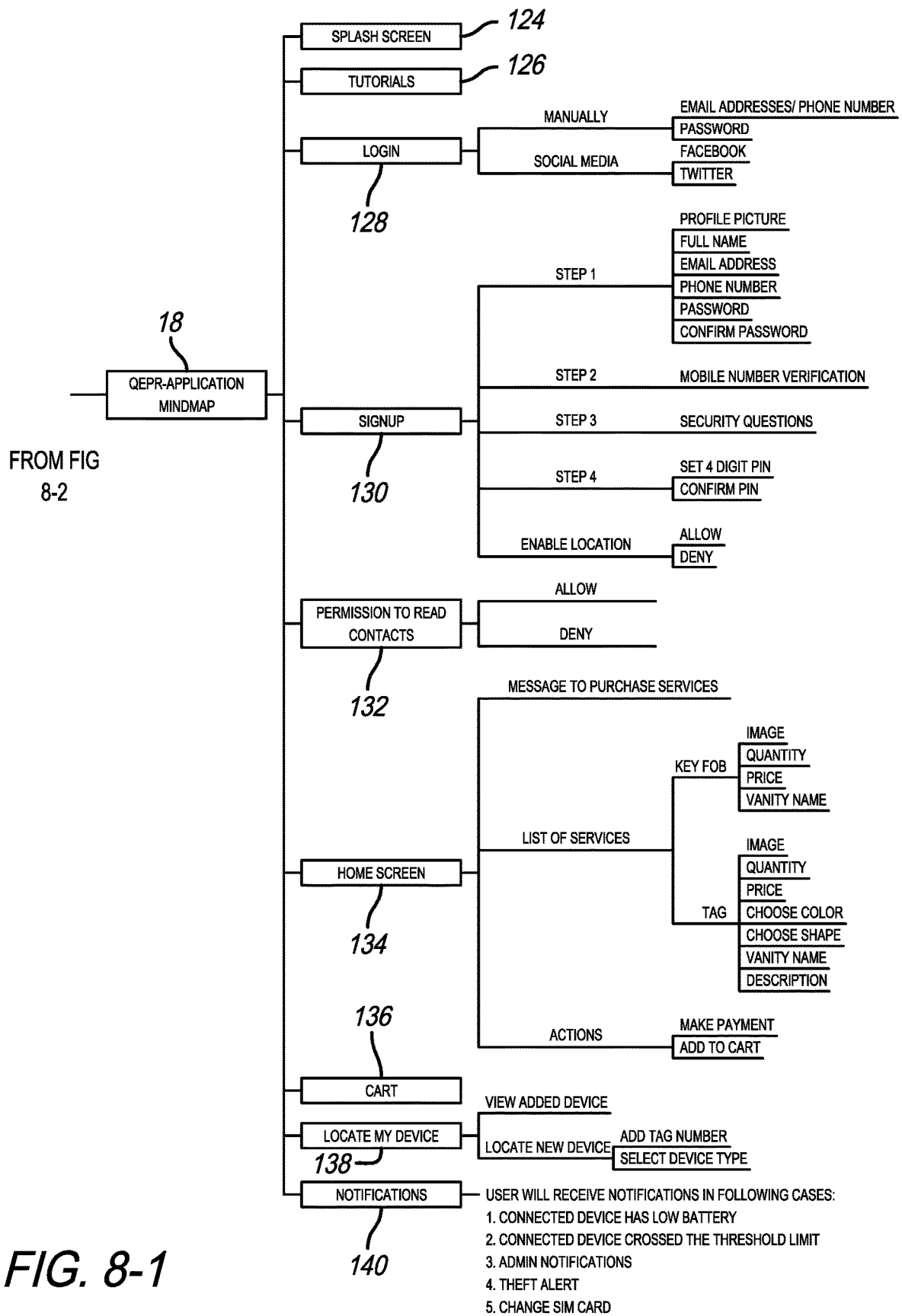
Figures 2, 8:
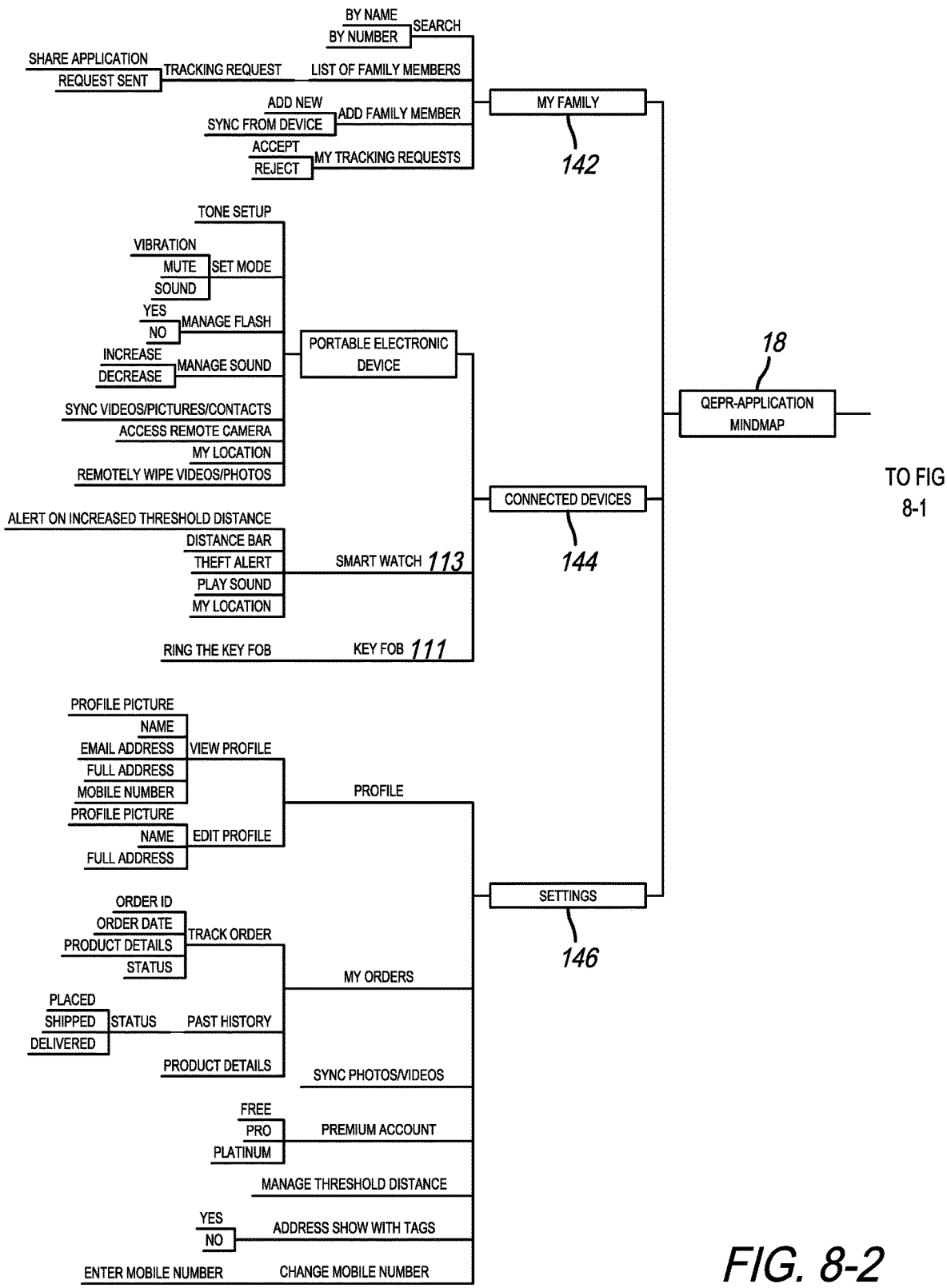
Figure 9:
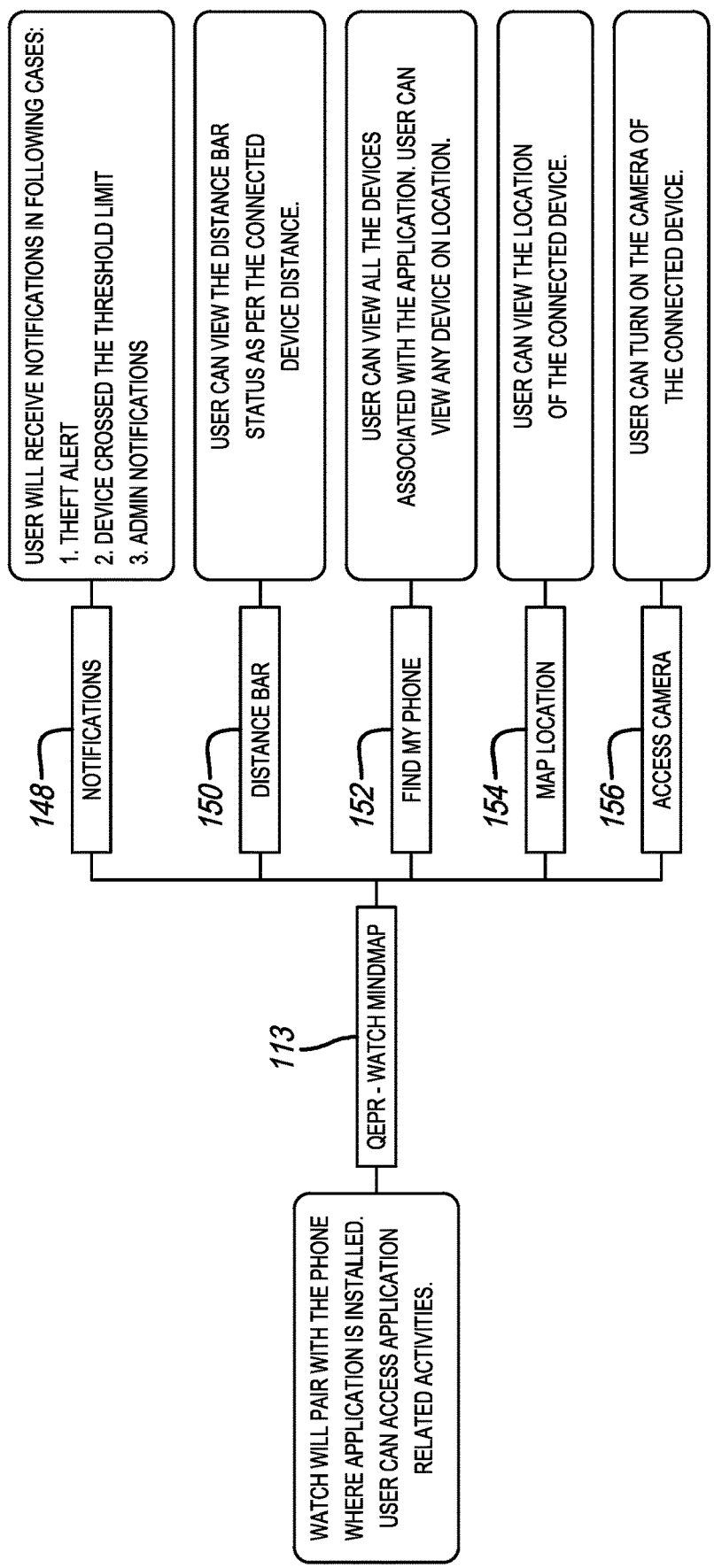
FIG. 9 shows an exemplary mind map of the watch app of the present invention.
Figure 10:
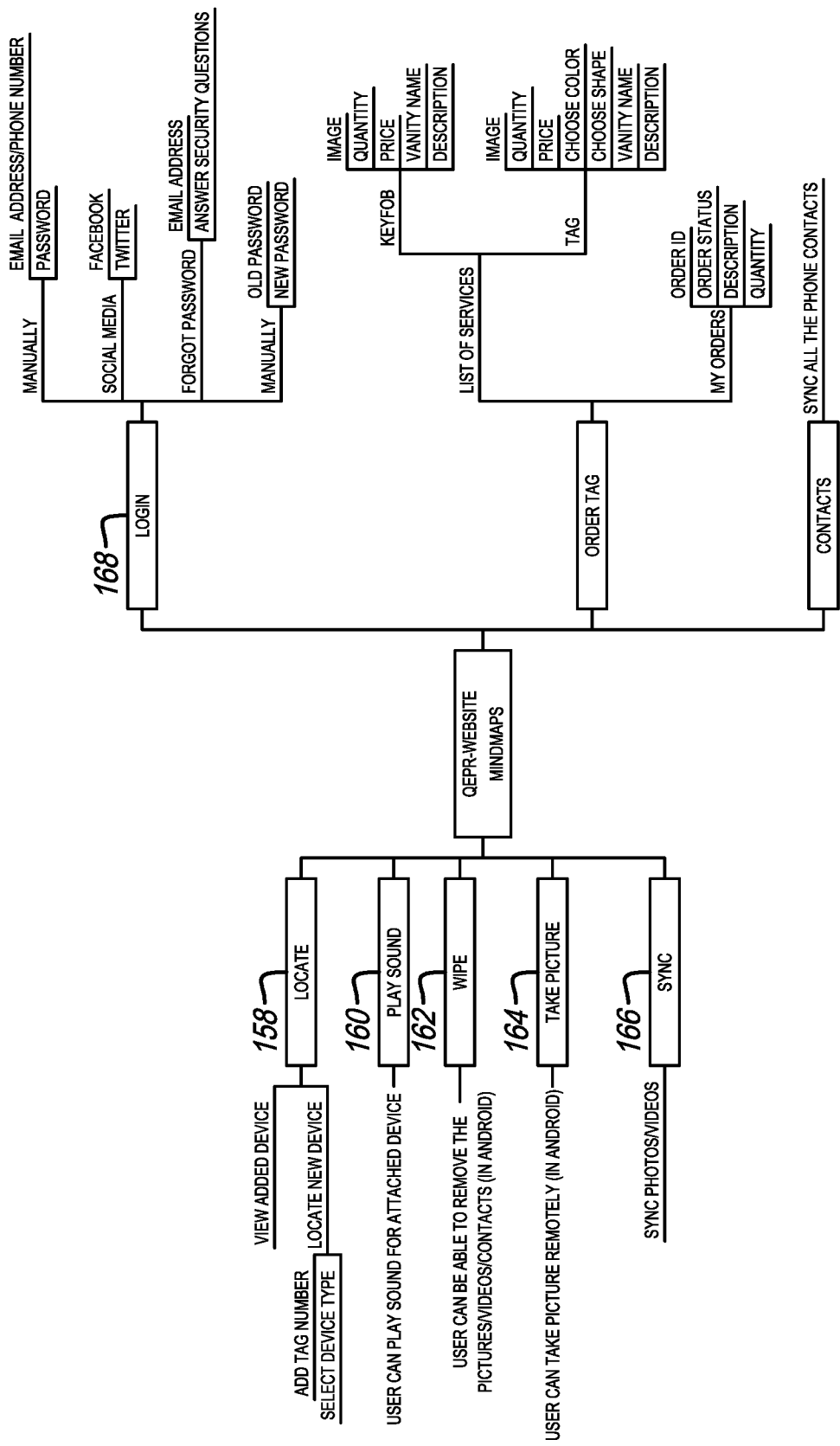
FIG. 10 shows an exemplary mind map of the website of the present invention.

As will be understood by those of ordinary skill in the art, FIGS. 8-10 show exemplary mind maps of the smart phone application (FIGS. 8-1 and 8-2), the smart watch application that associated with the loss prevention system (FIG. 9) and the website (FIG. 10), e.g., smartphoneregistry.com. The mind maps are described further below. It will be appreciated, that the mind maps are only exemplary and not limiting. Features can be added or omitted.

As shown in FIG. 8-1, the app 18 also includes a splash screen 130 when the app is opened and tutorials 132 for teaching a new user how to use the app. Login 134 includes the ability for manual login by entering an email address or phone number and a password or social media login through Facebook or Twitter, etc.

Under sign-up 130, the user follows a number of steps to register with the app. The exemplary steps are: step 1 where the user enters their profile picture, full name, email address, phone number and a password; step two where their mobile number is verified; step three where they provide answers to security questions; and step four where they set and confirm a PIN number. The user also has the ability to decide whether to enable location or GPS tracking of their phone (so that it can be seen on the website or watch app). Under permission to read contacts 132 the user has the ability to allow access to the contacts within their smart phone memory.

On the home screen 134 of the app 18 a message to purchase services is included. The list of services may include, for example, the ability to purchase a key fob 111 or a tag 40. The user has the ability to add these services or items to their cart 136 or make payment.

Under locate my device 138, the user has the ability to add a second connected device by adding the tag number associated with the device. In this situation, a user with first and second cell phones can view and track the second cell phone on the app on the first cell phone, and vice versa.

Notifications 140 can be made in a number of different situations, for example, that the connected device has a low battery, that the connected device has crossed the threshold or predetermined limit or distance, notifications from the administrator, alert that the connected device has been stolen and that the Sim card needs to be changed, among others.

With reference now to FIG. 8-2, the app allows the user to connect with or add other members of their family (or friends) under the "my family" 142 option. Under this option, the user has the ability to search for members by name or number, add a new family member by entering their information under "add new" or adding them from the device memory under "sync from device." Under "share application," the user can send to a friend or family member request to download the app on their phone. If the friend or family member downloads the app the user can request to track the friend or family members phone on the user's phone/app. For example, a parent could use this to track their child's phone.

Under the connected devices 144 option the user can connect to their portable electronic device, a smart watch 113 or a key fob 111 (or other devices listed herein). Once the portable electronic device is connected, the user can set up the tone used for alerts, set the mode for alerts, such as vibration mute or sound, manage whether the smart phone's flash is used for alerts, manage the sound by increasing or decreasing the volume, sync videos, pictures and/or contacts between the administrator and the device memory (as described below), and turn access to the phone's camera on or off.

Once a smart watch is connected, the watch app will alert the user when the connected device strays beyond the threshold distance. The watch app preferably includes a distance bar (as described below), and alerts the user after phone has been stolen (i.e., if the phone strays beyond the threshold distance). The app can also include a button that when pressed plays a sound on the phone (to locate the phone) and vice versa. The location of the watch can also be viewed on the connected device.

Once a key fob is connected, the key fob 111 and/or connected device rings or alerts when the threshold distance is crossed. Furthermore, a user can press the button 28 to cause the connected device to make a sound so the phone can be located. In a preferred embodiment, the sound made by the key fob can change as the key fob comes into closer proximity to the connected device or gets farther away from the connected device. For example, the sound can be a beeping that gets faster or slower between beeps or tones (increase or decrease in frequency) as the key fob gets closer or further away to the connected device. In another example, the sound change can get louder or softer as the key fob gets further away or closer to the connected device. This can also be done in reverse where a button on the phone app can be pressed to cause the key fob 111 to make a sound so that it can be located. In a preferred embodiment, this feature is achieved through received signal strength indicator (RSSI), which is a measurement of the power present in a received radio signal. The RSSI of the modem is indicated by a negative dBm value. This value relates to the signal strength of the cellular signal from the tower to the modem. The higher the number, the better the signal. The exact numbers vary between cellular carriers. However, −70 dBm and higher values usually equate to the modem being in an excellent coverage area. The closer to 0 dBm, the stronger the signal.

Under the settings 146 option the user has the ability to choose profile, under which they can view their profile or edit their profile. The profile includes a profile picture, name, email address, home or full address, and mobile number. On the app or the website, the user has the ability to order items, such as a tag 40 (with their unique registration identifier thereon) or case 42 (with their unique registration identifier thereon). The user can also view their orders. The user can track their order; which may include an order ID, and order date, product details and status. The user can also view the history of their past orders to see when they were placed, shipped and/or delivered. The user can also sync their contacts, photos and videos by uploading them to database 118 run by the administrator 123 (e.g., smartphoneregistry.com). In this situation, if a user's phone is lost and not returned, the contacts, photos and videos will be stored in a safe location. In an embodiment of the invention, smartphoneregistry.com includes a concierge service where the user can call and speak with somebody to help upload their contacts, photos and videos to either smartphoneregistry.com or other choice of location (e.g., iCloud, Google Drive).

Under settings, the user can also view what type of account they have (e.g., free, Pro, platinum) and upgrade or downgrade their account type. The user can also manage the threshold or predetermined boundary at which the alert will be sounded. The predetermined boundary can be an actual distance, such that when the user is too far from their smart phone (e.g., 5-500 feet) the alert or notification is sounded and/or vibrated, or, the alert or notification can be provided when the Bluetooth is out of range from the phone and disconnects.

Under settings, the user also has the ability to determine whether their home address will show when a finder finds their phone and enters their tag information on the website. If the user choose yes, the finder will learn the address and can then ship it directly to the owner or user. If the user chooses no, the finder will be given a separate address, such as a central holding location (e.g., smartphoneregistry.com). The finder then ships the phone to the central holding location where the phone is then forwarded to the owner. Settings also allows the user to change their mobile number.

FIG. 9 shows the smart watch 113 mind map. It will be appreciated that the watch is paired with the phone on which the application (e.g., FIG. 8) is installed. The watch app can also receive notifications such as when the connected smartphone has been stolen, when the connected smartphone has crossed the threshold limit and administrator notifications. The watch app also includes a distance bar so that the user can see how far away the connected device or smart phone is. For example, the distance bar can extend as the user gets farther away from the connected device and can show the distance in feet or meters.

Under find my phone 152, the user can find their phone when it has been lost. The user can view the location of the connected device on a map. This feature can also include the ability to cause the phone to ring or make a notification sound to find it, and to remotely wipe data as described herein.

Under map location 154, the user can view the location of their friends or families connected devices on a map. Under access camera 156 the user has the ability via the watch app to turn on the camera of the connected device. This allows the user to view on the watch what is being captured by the camera on the connected smart phone.

FIG. 10 shows the mind map for the website. Under locate 158 the user has the ability to add a second connected device, as described above. Under play sound 160, the user has the ability to press a button on the website that causes the connected device or phone to make a sound so that it can be located.

Under wipe 162, the user has the ability to remove or delete all of their pictures, videos, contacts and other personal information from a connected device. It will be appreciated that this will likely be done when a phone is lost or stolen. Under take picture 164, the user has the ability to take a picture with the connected device in an attempt to find out where the phone is located. The picture can be viewed on the website. Under sync 166, the user can upload their photos, videos and contacts, as described above. In the website, the user can also login 168, order services 174, and sync contacts 176 similar to what was described above with respect to the mind map for the app 18.

Figure 11:
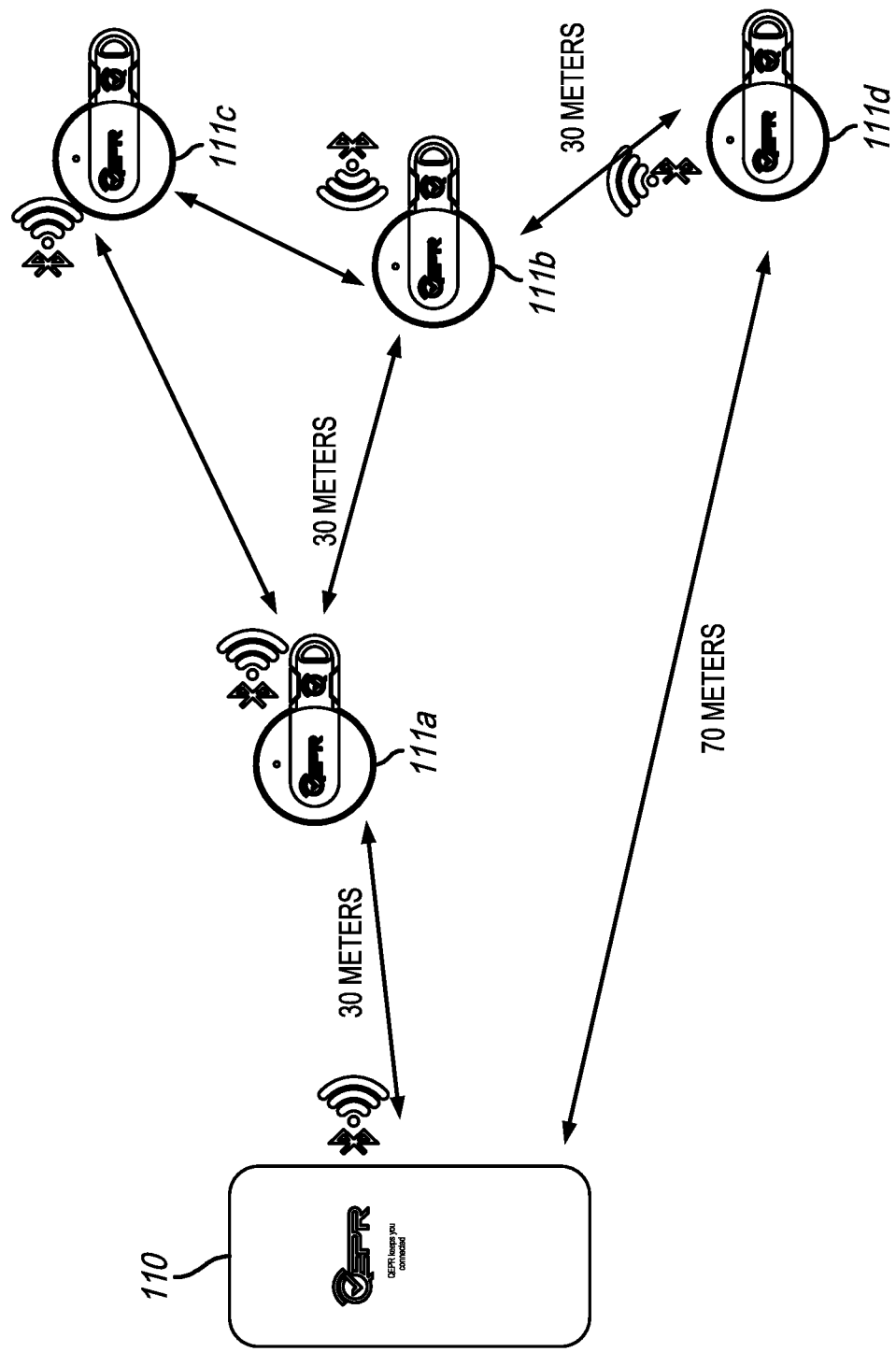
FIG. 11 shows an example of a bluetooth mesh network between a plurality of grouped distance tracking devices and a portable electronic device.

As shown in FIG. 11, in a preferred embodiment, the recovery system 10 includes the ability for a group 50 of users, such as a family, to each have a distance tracking device or key fob 111. Each of the distance tracking devices can be viewed on any of the associated portable electronic devices with the group 50. For example, FIG. 11 shows four key fobs 11. Each of the key fobs 11 is associated with a user and is associated with that user's mobile device. However, the location of each of the key fobs in the group 50 and the associated portable electronic devices can be viewed on the app 18 on each of the portable electronic devices in the group 50.

In a preferred embodiment, the present invention also includes the ability for the distance tracking devices within the group 50 to extend the distance of the bluetooth network or provide a BLE (Bluetooth Low Energy) mesh network. In other words, as shown in FIG. 11, a single portable electronic device can be connected via Bluetooth to distance tracking devices with the group that are further away via the mesh network. For example, as shown in FIG. 11, the first portable electronic device 110 is connected to the first key fob 111*a* that is paired with it and in range of bluetooth. First key fob 111*a* is in a mesh network with second and third keyfobs 111*b* and 111*c* because they are in range with first key fob 111*a*. Fourth key fob 111*d* is in range of the second key fob 111*b*. Therefore, all four key fobs are connected via a mesh network and can communicate with one another. Therefore, first key fob 111*a* receives data from second, third and fourth key fobs 111*b*, 111*c* and 111*d* (and vice versa). As a result, first key fob 111*a* communicates with the first portable electronic device and then passes data to the other key fobs (second to fourth). Furthermore, the mesh network allows the first portable electronic device to pass data or commands to any of the key fobs in the mesh network. This function can be useful, for example, when one member of the group does not have their phone and they want to find their beacon or key fob with another group member's phone. For example, as shown in FIG. 11, each of the key fobs separately have a bluetooth range of about 30 meters. Therefore, if the fourth key fob 111*d* is over 30 meters away from the portable electronic device it would normally be out of communication range. However, with the mesh network, communication between the fourth key fob 111d and the user mobile is provided. FIG. 11 shows an exemplary range within the network of 70 meters.

Figure 12:
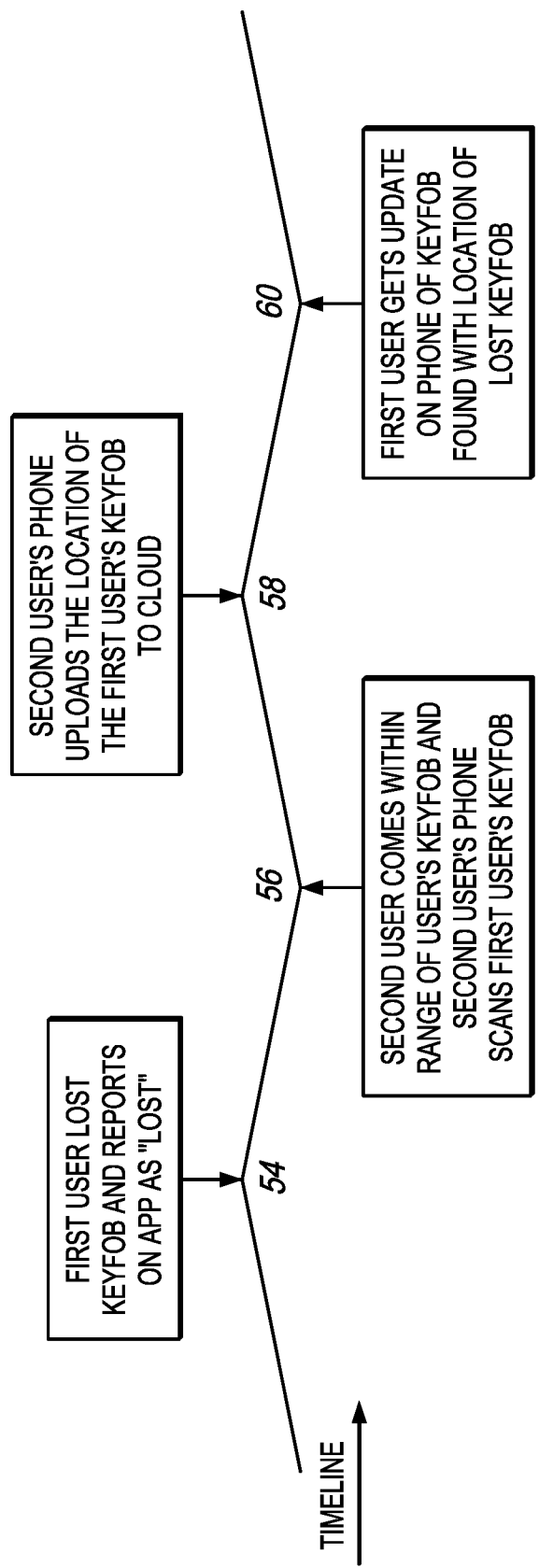
FIG. 12 shows an example of the steps for locating a lost distance tracking device.

As shown in FIG. 12, in a preferred embodiment, the recovery system 10 includes the ability to find a lost distance tracking device or key fob 111 that is scanned by another user's portable electronic device. In this scenario, when a first user's key fob is lost they would report it as lost on the app (see step 54). When a second user (who has the app on their phone) comes within bluetooth range of the first user's key fob, the second user's phone scans the lost key fob and uploads the location to the database/cloud (see step 56) (or otherwise uploads a UUID (universally unique identifier) and/or the unique registration identifier). A UUID can be associated with the key fob. The second user's portable electronic device then uploads the location of the lost key fob to the database or cloud (see step 58). The first user then receives an update on their associated portable electronic device (or computer or the like) that the lost key fob was found and is provided with a location so they can retrieve the lost key fob (see step 60).

Figure 13:
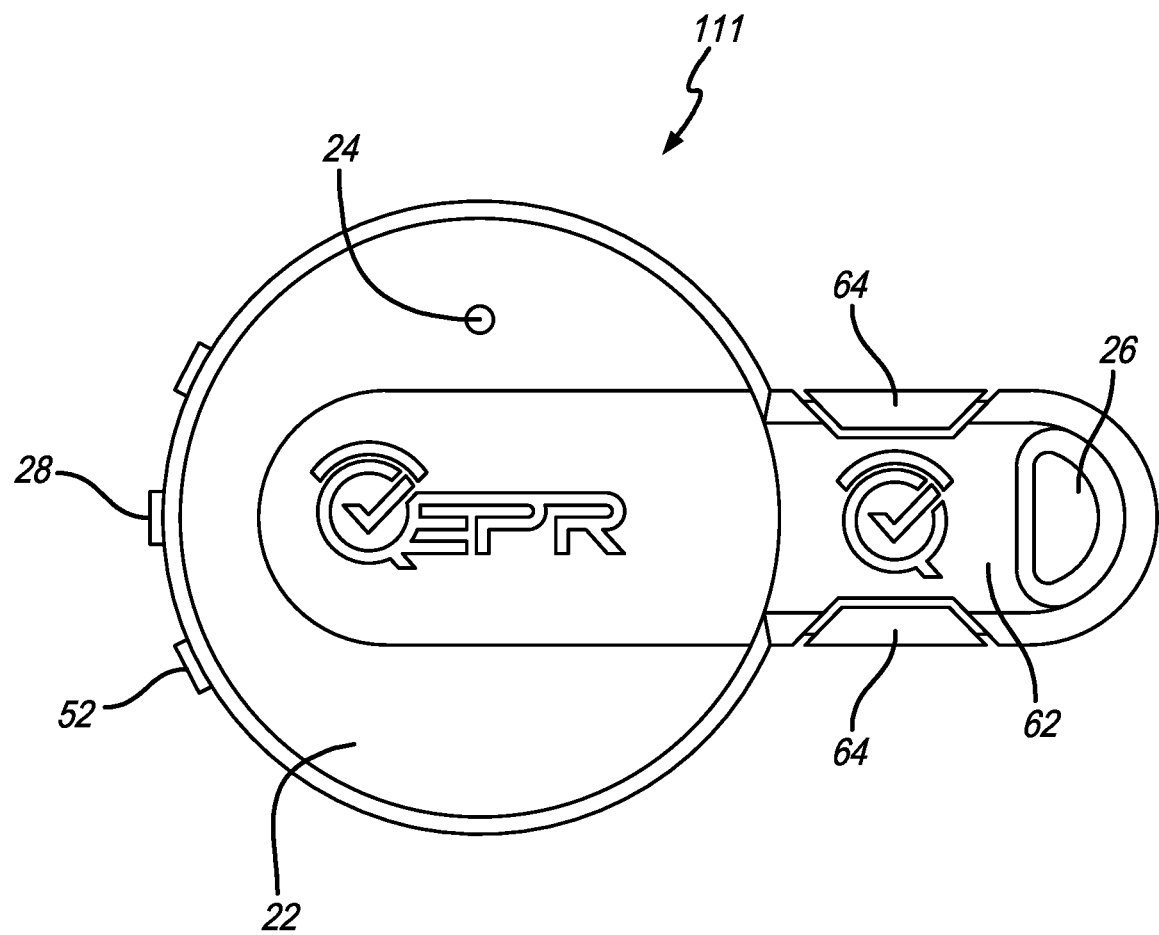
FIG. 13 is an elevational view of an exemplary key fob in accordance with a preferred embodiment of the present invention.

As shown in FIG. 13, in a preferred embodiment, the key fob 111 includes an SOS or emergency button 52 thereon that can be pressed by a user in the event of an emergency. For example, the emergency button 52 can be configured such that if it is depressed for a predetermined first period of time a first event happens, if it is depressed for a predetermined second period of time a second event happens, and if it is depressed for a predetermined third period of time a third event happens. Any number of periods of times and associated events is within the scope of the present invention. For example, if the button 52 is pressed or held down for five seconds an SOS event triggers an event where the user's emergency contact(s) are automatically contacted through the user's portable electronic device (e.g., via text, email, phone call, etc.). If the button 52 is pressed for ten seconds the associated phone automatically calls 911. If the button 52 is pressed for fifteen seconds the GPS data of the phone and/or the key fob is shared to the administrator and/or a designated contact.

As shown in FIG. 13, in a preferred embodiment, the key fob 111 includes a removable member 62 that has the keychain aperture 26 thereon. Therefore, the key fob 111 can be removed from the removable member 62 and be separated from the user's keys. The removable member 62 can include buttons 64 that operate a latch or the like so that the removable member 62 can be separated from the key fob 111.

In a preferred embodiment, a button on the key fob can activate the camera on the associated portable electronic device so that pictures can be taken. In an embodiment, where the same button is used for all functions on the key fob, for example, a triple (or other designated number) click on the key fob opens the camera and automatically takes a photo after a predetermined amount of time (e.g., 2 seconds) of the camera open event. In this embodiment, no separate actions/presses of the button are necessary for opening the camera and taking the photo. In another embodiment, if the button is pressed twice (or other amount) the camera opens and, after it is opened, a single press of the button can cause a picture to be taken. In a preferred embodiment, a button on the key fob can trigger an automated assistant, such as SIRI, Google Assistant or Alexa to be activated.

In a preferred embodiment, the system 10 includes the ability to locate a distance tracking device or key fob using the GSM network (or other mobile network) in addition to or as opposed to GPS data. Preferably, the key fob communicates directly with the cloud or database enabled with NBIoT. In other words, the key fob is connected with the NBIoT gateway, so that the key fob can send data directly to the NBIoT gateway without the need of cellphone connectivity.

In a preferred embodiment, the key fob can be a Wi-Fi extender. For example, a Wi-Fi access point can be placed in the key fob, which will be a Wi-Fi extender from the portable electronic device. This feature can combine with the BLE mesh network discussed above.

In a preferred embodiment, they key fob includes the ability to provide control of devices within a user's home (or other location) that are part of a smart home. For example, dedicated buttons can be provided on the key fob for controlling certain smart home appliances or applications.

In a preferred embodiment, the key fob provides the ability to authenticate the user to their mobile bank application. In other words, the bank app on the user's phone can only be opened using the key fob, for example, by pressing a dedicated button or performing another action. It will be appreciated that each key fob has a unique identity. Therefore, when a particular key fob is paired with the user's phone the bank app on the user's phone will only be opened by a press of a button (or other action) on the user's key fob. Buttons are mentioned herein for providing several functions and actions. As described herein, the distance tracking device can include several discrete buttons for each action, a single button that is either pressed for a predetermined amount of time before an action is triggered or is pressed multiple times within a predetermined amount of time to trigger an action (e.g., double clicking a mouse) or a combination of both. It should be understood that the button is a switch. Accordingly, as used herein, the phrase "a button is activated", "a button that when activated", "activation of the button" or anything similar encompasses any of the button pressing actions or switching actions or methods described herein.

In another embodiment, the associated software application 18 includes an artificial intelligence based assistant that gives the user the feeling of personal chat for commands and/or can also recognize key fob or phone losing patterns of the user and notify the user in advance to keep track of their phone.

In a preferred embodiment, the key fob can be wirelessly charged. A wireless charging coil and supporting electronic components can be added to the key fob for this feature. With this feature, the key fob can be charged from the back of a smartphone that enables wireless power transfer, for example. In another embodiment, it can be charged via a wired connection.

In a preferred embodiment, the system 10 includes GSM based location sharing between designated users (e.g., users within a group 50). With this feature each user in the group be able to see the real time locations of their designated contacts (e.g., emergency contacts, family members) on the app. Preferably, the users' locations are available through the cellular connection provider of the individual phones without GPS. In another embodiment, the locations are available via GPS. In this situation, a GSM connection is used in case GPS is not available in (e.g., in an indoor area) to provide the location of the desired contact or user.

In a preferred embodiment, the system includes a safe zone within which the distance tracking device will not sound or vibrate the notification even if the associated portable electronic device is outside the predetermine boundary. This can be used, for example, in a home, at a business or another designated location. Using a home as an example, if the user places their keys (with the distance tracking device) at a location in the home and the predetermined boundary is thirty feet, and the user takes the associated portable electronic device farther away than thirty feet, the notification will not go off. This can be done, for example, by using the home's wi-fi network. As long as the phone and/or key fob is connected to the wi-fi network the notification will not be activated. However, as soon as the user leaves the home with one or the other of the phone or key fob and not the other of the phone or key fob and the device disconnects from the wi-fi, the notification will go off.

All text on FIGS. 1-13 is incorporated herein by reference.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for loss prevention and loss recovery of portable electronic devices, the system comprising:
   a server administered by an administrator,
   a first software application executable on a first portable electronic device in communication with the server, wherein the first portable electronic device is owned by a first user,
   a second software application executable on a second portable electronic device in communication with the server, wherein the second portable electronic device is owned by a second user,
   a first unique registration identifier associated with the first portable electronic device, wherein the association between the first portable electronic device and the first unique registration identifier is stored on the server,
   a second unique registration identifier associated with the second portable electronic device, wherein the association between the second portable electronic device and the second unique registration identifier is stored on the server, and a first distance tracking device, wherein the first software application is configured to connect to the first distance tracking device, wherein the first distance tracking device is configured to provide a first notification when the first distance tracking device is further than a predetermined boundary from the first portable electronic device, and wherein the first distance tracking device includes a first bluetooth range within which the first distance tracking device is in communication with the first portable electronic device, a second distance tracking device, wherein the second software application is configured to connect to the second distance tracking device, wherein the second distance tracking device is configured to provide a second notification when the second distance tracking device is further than a predetermined boundary from the second portable electronic device, and wherein the second distance tracking device includes a second bluetooth range within which the second distance tracking device is in communication with the first distance tracking device, wherein a third bluetooth range is defined between the first portable electronic device and the second distance tracking device, and wherein the third bluetooth range is greater than the first and second bluetooth ranges, wherein when the first unique registration identifier is entered at a website associated with the server, return delivery information associated with the first portable electronic device is provided, and wherein when the second unique registration identifier is entered at the website associated with the server, return delivery information associated with the second portable electronic device is provided, wherein the first and second portable electronic devices can be associated with a group, wherein a location of the first portable electronic device can be seen on the second software application.

2. The system of claim 1 wherein the first distance tracking device includes a key fob and a removable member, wherein the removable member can be separated from the key fob, and wherein the removable member includes a keychain aperture defined therein.

3. The system of claim 1 further comprising a first tag that includes the first unique registration identifier thereon, wherein the first tag is secured to the first portable electronic device or a first case for the first portable electronic device.

4. The system of claim 3 wherein the first tag includes near-field communication such that it can communicate the first unique registration identifier.

5. The system of claim 1 wherein the first distance tracking device is configured such that the first notification changes from a first state to a second state as the first distance tracking device comes into closer proximity to the first portable electronic device.

6. A system for loss prevention and loss recovery of portable electronic devices, the system comprising:
a server administered by an administrator,
a first software application executable on a first portable electronic device in communication with the server, wherein the first portable electronic device is owned by a first user,
a second software application executable on a second portable electronic device in communication with the server, wherein the second portable electronic device is owned by a second user,
a first unique registration identifier associated with the first portable electronic device, wherein the association between the first portable electronic device and the first unique registration identifier is stored on the server,
a second unique registration identifier associated with the second portable electronic device, wherein the association between the second portable electronic device and the second unique registration identifier is stored on the server, and
a first distance tracking device, wherein the first software application is configured to connect to the first distance tracking device, wherein the first distance tracking device is configured to provide a first notification when the first distance tracking device is further than a predetermined boundary from the first portable electronic device, wherein the first distance tracking device includes a button thereon, wherein activation of the button causes the first portable electronic device to perform a first action, wherein the first action is chosen from dial 911, dial a contact, message one or more contacts,
a second distance tracking device, wherein the second software application is configured to connect to the second distance tracking device, wherein the second distance tracking device is configured to provide a second notification when the second distance tracking device is further than a predetermined boundary from the second portable electronic device,
wherein when the first unique registration identifier is entered at a website associated with the server, return delivery information associated with the first portable electronic device is provided, and wherein when the second unique registration identifier is entered at the website associated with the server, return delivery information associated with the second portable electronic device is provided.

7. A system for loss prevention and loss recovery of portable electronic devices, the system comprising:
a server administered by an administrator,
a first software application executable on a first portable electronic in communication with the server, wherein the first portable electronic device is owned by a first user,
a second software application executable on a second portable electronic in communication with the server, wherein the second portable electronic device is owned by a second user,
a first unique registration identifier associated with the first portable electronic device, wherein the association between the first portable electronic device and the first unique registration identifier is stored on the server,
a second unique registration identifier associated with the second portable electronic device, wherein the association between the second portable electronic device and the second unique registration identifier is stored on the server, and
a first distance tracking device, wherein the first software application is configured to connect to the first distance tracking device, wherein the first distance tracking device is configured to provide a first notification when the first distance tracking device is further than a predetermined boundary from the first portable electronic device, wherein the first distance tracking device includes a button thereon, wherein activation of the button for a first predetermined amount of time causes a first action to occur and activation of the button for a second predetermined amount of time causes a second action to occur, and wherein the first and second actions are chosen from dial 911, dial a contact, message one or more contacts,
a second distance tracking device, wherein the second software application is configured to connect to the second distance tracking device, wherein the second distance tracking device is configured to provide a second notification when the second distance tracking device is further than a predetermined boundary from the second portable electronic device,
wherein when the first unique registration identifier is entered at a website associated with the server, return delivery information associated with the first portable electronic device is provided, and wherein when the second unique registration identifier is entered at the website associated with the server, return delivery information associated with the second portable electronic device is provided.

8. A system for loss prevention and loss recovery of portable electronic devices, the system comprising:
a server administered by an administrator,
a first software application executable on a first portable electronic in communication with the server, wherein the first portable electronic device is owned by a first user,
a second software application executable on a second portable electronic in communication with the server, wherein the second portable electronic device is owned by a second user,
a first unique registration identifier associated with the first portable electronic device, wherein the association between the first portable electronic device and the first unique registration identifier is stored on the server,
a second unique registration identifier associated with the second portable electronic device, wherein the association between the second portable electronic device and the second unique registration identifier is stored on the server, and
a first distance tracking device, wherein the first software application is configured to connect to the first distance tracking device, wherein the first distance tracking device is configured to provide a first notification when the first distance tracking device is further than a predetermined boundary from the first portable electronic device, wherein the first distance tracking device includes a Wi-Fi access point therein, whereby the first tracking device is a Wi-Fi extender that the first portable electronic device can connect to,
a second distance tracking device, wherein the second software application is configured to connect to the second distance tracking device, wherein the second distance tracking device is configured to provide a second notification when the second distance tracking device is further than a predetermined boundary from the second portable electronic device,
wherein when the first unique registration identifier is entered at a website associated with the server, return delivery information associated with the first portable electronic device is provided, and wherein when the second unique registration identifier is entered at the website associated with the server, return delivery information associated with the second portable electronic device is provided.

9. A computer-implemented method for the loss prevention and loss recovery of a first user's portable electronic device, the method comprising the steps of:
loading a first software application on the portable electronic device, wherein the first software application is associated with a server,
associating a first unique registration identifier with the first user's portable electronic device,
obtaining a first distance tracking device, wherein the first distance tracking device is configured to provide a notification when the first distance tracking device is further than a predetermined boundary from the first user's portable electronic device,
connecting the first distance tracking device to the first software application,
placing the first unique registration identifier on the first user's portable electronic device or a case for the first user's portable electronic device, and
reporting the first distance tracking device as lost to the server, wherein the first distance tracking device has a bluetooth range, wherein when a second user's portable electronic device enters the bluetooth range, the second user's portable electronic device communicates a location of the first distance tracking device to the server, and wherein the method further comprises communicating the location of the first distance tracking device to the first user's portable electronic device.

10. The computer-implemented method of claim 9 further comprising the steps of:
loading a second software application on a second user's portable electronic device, wherein the second software application is associated with the server,
associating a second unique registration identifier with the second user's portable electronic device,
obtaining a second distance tracking device, wherein the second distance tracking device is configured to provide a notification when the second distance tracking device is further than a predetermined boundary from the second user's portable electronic device,
connecting the second distance tracking device to the second software application,
placing the second unique registration identifier on the second user's portable electronic device or a case for the second user's portable electronic device, and
associating the first and second users' portable electronic devices with a group.

11. The computer-implemented method of claim 9 wherein the first unique registration identifier is associated with a tag that includes near-field communication, and the method further comprises placing a second user's portable electronic device in close proximity to the tag, wherein the first unique registration identifier is communicated to the second user's portable electronic device.

12. A kit for loss prevention and recovery of a portable electronic device, the kit comprising:
a tag configured to be secured to a portable electronic device or a case for a portable electronic device, wherein the tag includes a unique registration identifier and a contact source thereon, wherein the contact source includes at least one of a telephone number, a website or an email address, wherein the tag includes near-field communication such that it can communicate the unique registration identifier, and wherein the unique registration identifier is associated with a QR code, and
a distance tracking device that is configured to connect to a portable electronic device that has been associated with the unique registration identifier, wherein the distance tracking device is configured to provide a notification when the distance tracking device is further than a predetermined boundary from the portable electronic device that has been associated with the unique registration identifier, wherein the predetermined boundary is at least one of a predetermined distance or when the distance tracking device disconnects from the associated portable electronic device, wherein the first distance tracking device is configured such that the first notification changes from a first state to a second state as the first distance tracking device comes into closer proximity to the first portable electronic device, wherein the distance tracking device is a key fob, wherein the key fob includes a button that when activated causes the associated portable electronic device to emit at least one of a sound or a vibration, wherein activation of the button causes the first portable electronic device to perform a first action, wherein the first action is chosen from dial 911, dial a contact, message one or more contacts, wherein the first distance tracking device includes the key fob and a removable member, wherein the removable member can be separated from the key fob, and wherein the removable member includes a keychain aperture defined therein.

13. The kit of claim 12 wherein activation of the button for a first predetermined amount of time causes a first action to occur and activation of the button for a second predetermined amount of time causes a second action to occur, and wherein the first and second actions are chosen from dial 911, dial a contact, message one or more contacts.

* * * * *